United States Patent [19]
Okamura

[11] Patent Number: 5,768,028
[45] Date of Patent: Jun. 16, 1998

[54] SCANNING OPTICS

[75] Inventor: Tetsuro Okamura, Nagano, Japan

[73] Assignee: Kabushiki Kaisha Sankyo Seiki Seisakusho, Nagano, Japan

[21] Appl. No.: 578,309

[22] Filed: Dec. 26, 1995

[30] Foreign Application Priority Data

Dec. 26, 1994 [JP] Japan ................... 6-337327

[51] Int. Cl.⁶ .................. G02B 26/08; G02B 3/02
[52] U.S. Cl. .................. 359/662; 359/206
[58] Field of Search .................. 359/662, 206, 359/718, 719

[56] References Cited

U.S. PATENT DOCUMENTS 4,695,132  9/1987  Sakuma .................. 359/662
5,153,767  10/1992  Makino .................. 359/662

FOREIGN PATENT DOCUMENTS 63-210815  9/1988  Japan.

*Primary Examiner*—Scott J. Sugarman
*Attorney, Agent, or Firm*—Morgan, Lewis & Bockius LLP

[57] ABSTRACT

Single convex lens element has a positive power in both the main and sub-scanning directions on the surface which is the closer to the surface to be scanned and which is anamorphic such that any section taken through a plane that is parallel to the central optical axis and which is normal to the main scanning direction provides a generally constant surface geometry along the length of that surface. This lens ensures not only the production of a good image plane and satisfactory fθ characteristics in the main scanning direction but also the effective correction of the curvature of the field in the sub-scanning direction.

6 Claims, 5 Drawing Sheets

IMAGE HEIGHT +71.6
IMAGE HEIGHT -71.6
2.000(mm)

1.000(%)

20.000(mm)

1.000(%)

SCANNING OPTICS

BACKGROUND OF THE INVENTION

1. Field of the invention

The present invention relates to scanning optics by which a laser light beam deflected from a deflecting reflective surface of a light deflector is focused as a spot on the surface to be scanned.

2. Related art

Rays of light from a laser are deflected at uniform angular velocity by means of a deflecting reflective surface or surfaces of a rotating polygonal, single, or double mirror and focused by scanning optics to form a beam spot that scans over a surface of interest. Optical scanners operating on this principle are extensively used in optical printers and digital copiers.

If the light deflector used in such optical scanners is a rotating polygonal mirror, its deflecting reflective surfaces may not be completely parallel to the rotating shaft and if the deflector is a rotating single or double mirror, the rotating shaft may vibrate; in either case, the position of the scanning line provided by the beam spot varies in the sub-scanning direction.

A method conventionally held to be effective in correcting this problem which is generally referred to as "tilting" is such that rays of light from a source are focused as a line in the main scanning direction in a position near a deflecting reflective surface in the sub-scanning direction and that the scanning optics is provided with the capability of assuring that the position of a deflecting and reflective surface and the scanning position satisfy a conjugated relationship in geometrical optical terms in the sub-scanning direction. The scanning optics in such optical scanners provides "anamorphic" imaging optics which have different powers in the main and sub-scanning directions.

For successful light scanning with the optical scanners, it is required that the diameter of a beam spot should not vary greatly with the height of an image and that the beam spot should move at uniform speed. The diameter of a beam spot varies with the height of an image if the scanning optics has a curvature of the field. If the spot diameter varies with the image height, the image written by scanning will not have a uniform resolution. Small variations in the spot diameter that occur in the main scanning direction can effectively be corrected by electric control of the signal to be carried on the deflected rays of light but this method is ineffective in correcting the variations in the spot diameter that occur in the sub-scanning direction. Speaking of the uniformity in the speed at which the beam spot moves, both the fθ characteristics of the scanning optics and the curvature of the field must be corrected effectively in order to meet this requirement. However, it is not easy for an anamorphic lens to assure that both the fθ characteristics and the field curvature in the sub-scanning direction are effectively corrected and, in practice, a plurality of lens elements are combined to make the scanning optics.

Consider, for example, the case of correcting the fθ characteristics by means of a convex lens. If the aberrational requirements in the main scanning direction (for the image plane and fθ characteristics in the main scanning direction), the rear surface of the convex lens which is the closer to the surface to be scanned has a greater curvature than the front surface which is the closer to a deflecting reflective surface. If the scanning optics is to be composed of a single lens, its rear surface must be rendered toric so that the deflecting reflective surface is conjugated with the surface to be scanned but then the image plane in the sub-scanning direction will be undercorrected. Exemplary data on the field curvature and fθ characteristics provided by this toric surface are shown in FIGS. 5a and 5b, respectively. The dashed line in FIG. 5a represents the image plane in the main scanning direction and the solid line represents the image plane in the sub-scanning direction.

Thus, it has been difficult in the prior art to use a single convex lens element and yet ensure that a good image plane and satisfactory fθ characteristics are obtained in the main scanning direction while correcting effectively the field of the curvature in the sub-scanning direction. As typically shown in Unexamined Published Japanese Patent Application Sho 63-210815, a convex f lens must be combined with a special lens for correcting the image plane but this only makes the overall construction complex and results in a lower production rate.

SUMMARY OF THE INVENTION

An object, therefore, of the invention is to provide scanning optics which ensures that not only the provision of a good image plane and satisfactory fθ characteristics in the main scanning direction but also the correction of the curvature of the field in the sub-scanning direction can be effectively accomplished using a single convex lens element.

According to the present invention, there is provided scanning optics that has an fθ capability in the main scanning direction and which establishes in the sub-scanning direction a generally conjugated relationship in geometrical optical terms between the position of a deflecting reflective surface and that of the surface to be scanned, thereby providing a capability for correcting the tilting of an image plane in the sub-scanning direction, comprising:

a single convex lens element such that the surface which is the closer to the surface to be scanned is convex in both the main and sub-scanning directions and such that any section taken through a plane which is parallel to the central optical axis of said scanning optics and which is normal to the main scanning direction has a generally constant surface geometry in said main scanning direction.

According to the present invention, the scanning optics of the invention is composed of a single convex lens element having a positive (convergent) power in both the main and sub-scanning directions on the surface which is the closer to the surface to be scanned and which is anamorphic such that any section taken through a plane that is parallel to the central optical axis and which is normal to the main scanning direction provides a substantially constant surface geometry in the main scanning direction. This design ensures that not only the production of a good image plane and satisfactory fθ characteristics in the main scanning direction but also the correction of the field curvature in the sub-scanning direction can be accomplished with a single convex lens element, whereby the construction of the scanning optics is simplified to achieve a higher production rate.

DETAILED DESCRIPTION OF THE PREFERRED EMBODIMENTS

Four examples of the invention will now be described in detail.

Each of the four examples to be described below operates on the assumption that rays of light from a laser are collimated and then focused only in the sub-scanning direction such that a line image elongated in the main scanning direction is formed near a deflecting deflective surface of a light deflector. The thus focused rays are deflected at uniform speed by means of the deflector and passed through scanning optics to form a beam spot on the surface to be scanned. Therefore, in the scanning optics of the invention, the light source at infinity and the position of the surface to be scanned are adapted to satisfy an in-focus, or conjugated, relationship in the main scanning direction whereas the position of the deflecting reflective surface and that of the surface to be scanned are also adapted to satisfy a conjugated relationship in the sub-scanning direction.

Figure 1A:
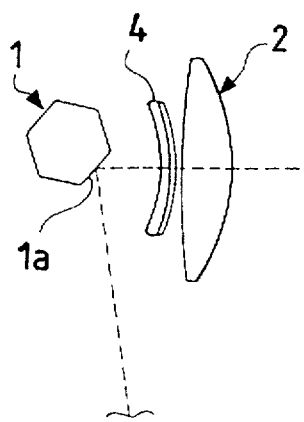
FIGS. 1a and 1b shows in plan view the theoretical layout of scanning optics incorporating the concept of the invention.
Figure 1B:
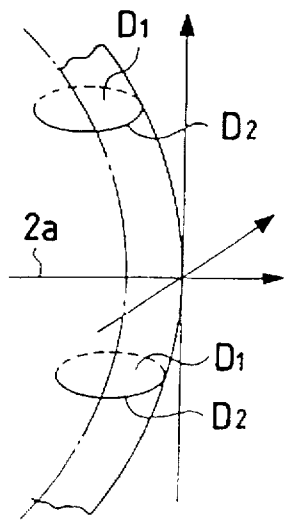

FIGS. 1a and 1b show in plan view the theoretical layout of scanning optics incorporating the concept of the invention. As shown in FIG. 1a, the rays of light reflected by a polygonal mirror 1 (light deflector) at a deflecting reflective surface 1a are passed through a convex lens 2 which comprises the scanning optics of the invention, such that they are focused to form a beam spot for scanning the surface 3a of a photoreceptor drum 3. The exit surface of the convex lens 2 which is closer to the surface to be scanned is formed as an anamorphic surface. As shown in FIG. 1b, the anamorphic surface is such that any cross-section $D_2$ that is taken through a plane $D_1$ which is parallel to the central optical axis 2a of scanning light but which is normal to the main scanning direction provides generally a constant surface geometry or has a substantially identical radius of curvature along the length of that surface. This surface geometry ensures that a good image plane and satisfactory fθ characteristics can be obtained in the main scanning direction simultaneously with the effective correction of the curvature of the field in the sub-scanning direction.

As also shown in FIGS. 1a and 1b, a lens 4 for adjusting magnification in the sub-scanning direction is provided adjacent the convex lens 2 on the side which is the closer to the deflecting reflective surface of the rotating polygonal mirror 1. The lens 4 is optional and may be provided if it is necessary to adjust magnification in the sub-scanning direction following the change in magnification in the main scanning direction.

Figure 3:
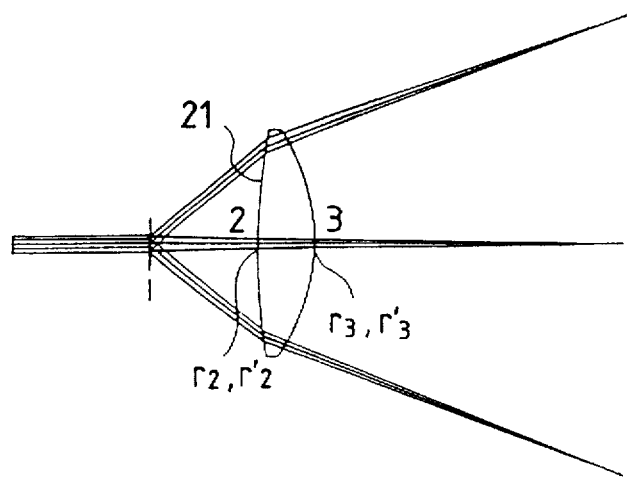
FIG. 3 is a plan view showing scanning optics according to the first example of the invention.

We now describe scanning optics according to the first example of the invention which is shown in FIG. 3. The scanning optics is composed of a single convex lens element 21 which has the anamorphic surface defined above. A deflecting reflective surface of the light deflector (not shown) is indicated by numeral 1; the front surface of the convex lens 21 which is the closer to the deflecting reflective surface is indicated by numeral 2; and the rear surface of the convex lens 21 which is closer to the surface to be scanned is indicated by numeral 3. Each lens surface has a curvature radius $r_i$ in the main scanning direction (the subscript i used hereinafter signifies an individual lens surface number), a curvature radius $r'_i$ in the sub-scanning direction, an axial distance $d_i$ from the ith surface to the (i+1)th surface, and a refractive index $n_i$ at the operating wavelength of the laser (780 nm), and these parameters assume the following values:

| i | $r_i$ | $r'_i$ | $d_i$ | $n_i$ |
|---|-------|--------|-------|-------|
| 1 | 0.0000 | 0.0000 | 32.6000 | 1.00000 |
| 2 | 183.4000 | 183.4000 | 16.9500 | 1.48601 |
| 3 | −64.1300 | −15.4000 | 97.0000 | 1.00000 |

The first surface which is a deflecting reflective surface of the light deflector is flat and the radius of its curvature ($r_1$) is expressed as 0.0000 for the sake of convenience.

The second surface is an aspheric surface of revolution x, which is expressed by:

$$x=(1/r)y^2/\{1+\sqrt{[1-(1+k)y^2/r^2]}\}+ay^4+by^6+cy^8+dy^{10}$$

where the respective aspheric coefficients assume the following values:

k=0.00000E+00; a=−0.89700E−06; =0.27800E−09 c=0.00000E+00; d=−0.24600E−16 where E+00 stands for "×10⁰", E−06 "×10⁻⁶", E−09 "×10⁻⁹" and E−16 "×10⁻¹⁶"; and where $r=r_2=r'_2$. It should also be noted that $r_2$ and $r'_2$ at the optical axis are equal to 183.4000.

The second surface has a focal length (FL) of 100.003.

The third surface is the rear surface of the convex lens 21 which is closer to the surface to be scanned. As is clear from the data on the radius of curvature ($r_3$=−64.1300 and $r'_3$=−15.4000), the third surface has a positive power (to exert a converging action) in both the main and subscanning directions. Another feature of the third surface is that any section taken through a plane that is parallel to the central optical axis and which is normal to the main scanning direction has the same radius of curvature along the length of that surface at any point in the main scanning direction, thereby providing a constant surface geometry.

Figure 2:
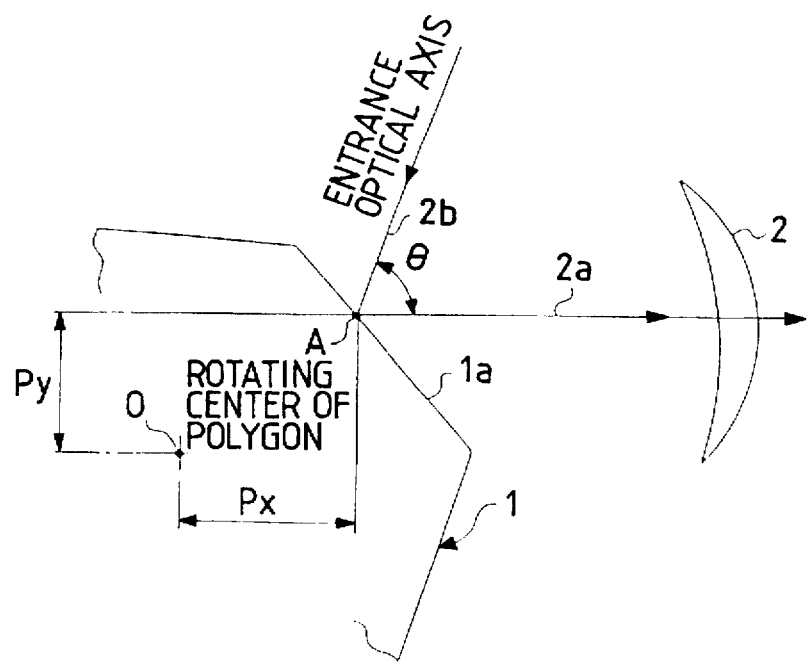
FIG. 2 is another diagram illustrating the theoretical aspect of the invention.

FIG. 2 is another diagram illustrating the theoretical aspect of the invention, in which the respective symbols have the following definitions: O, the center of rotation of the light deflector 1; Pr, the radius of an inscribed circle of the deflector 1; A, the point of intersection between a deflecting reflective surface 1a of the deflector 1 and the optical axis 2a of the convex lens 2 as scanning optics, or the point of incidence at which the entrance optical axis 2b falls on the deflecting reflective surface 1a; θ, the angle the entrance optical axis 2b forms with the optical axis 2a at point A; Px is the axial distance from point A to the center of rotation O; and Py is the distance from A to O as taken in a direction normal to the optical axis 2a. In the first example under consideration, these symbols take the following values:

$Pr=13.2; \theta=800; Px=10.17; Py=8.82$

Figure 4A:
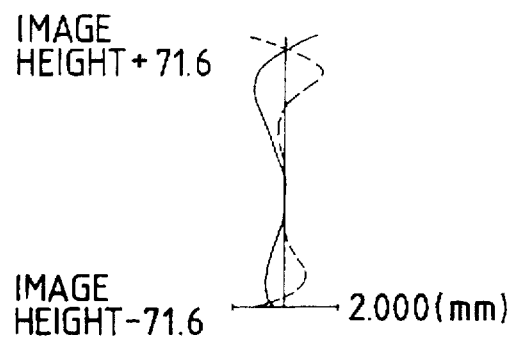
FIGS. 4a and 4b are graphs showing the field curvature and fθ characteristics, respectively, of the scanning optics shown in FIG. 3 which is in accordance with the first example of the invention.
Figure 4B:
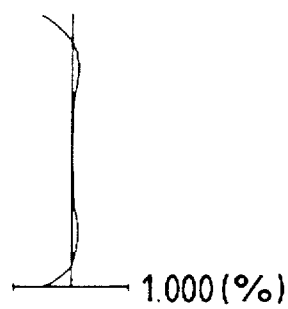
Figure 5A:
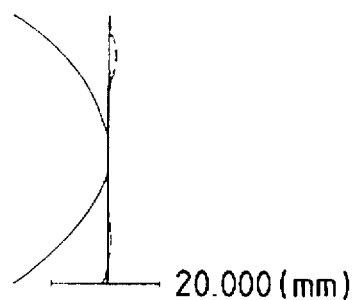
FIGS. 5a and 5b are graphs showing exemplary data on the field curvature and fθ characteristics, respectively, of a toric single lens.
Figure 5B:
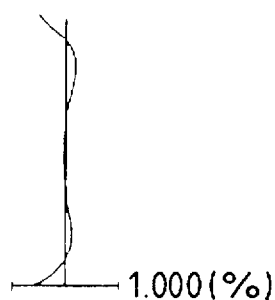

The field curvature and fθ characteristics of the scanning optics according to the first example of the invention are shown in FIGS. 4a and 4b, respectively. The dashed line in FIG. 4a represents the image plane in the main scanning direction and the solid line represents the image plane in the sub-scanning direction.

Figure 6:
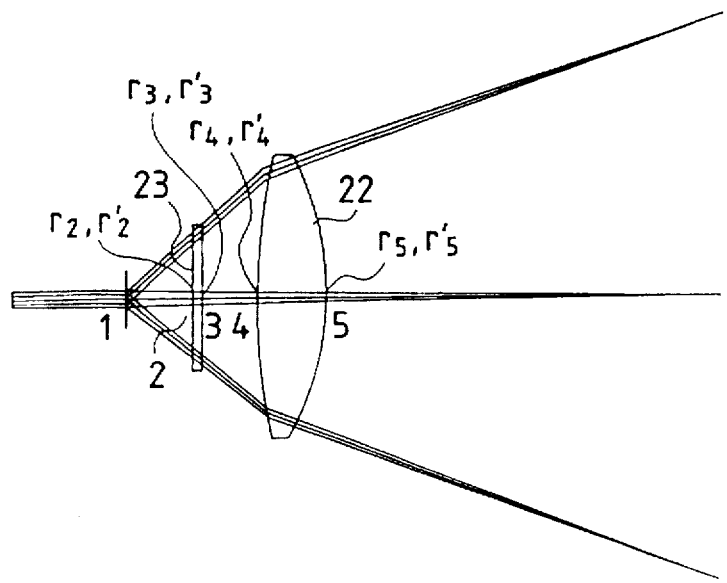
FIG. 6 is a plan view showing scanning optics according to the second example of the invention.

FIG. 6 is a plan view showing scanning optics according to the second example of the invention. As in the first example, the optics is composed of a single convex lens element 22 having the defined anamorphic surface. In the second example, a magnification adjusting lens 23 is provided adjacent the convex lens 22 on the side which is closer to a deflecting reflective surface of the light deflector. The lens 23 brings the image plane in the sub-scanning direction into coincidence with the image plane in the main scanning direction when magnification in the sub-scanning direction is reduced.

A deflecting reflective surface of the light deflector (not shown) is indicated by numeral 1; the front surface of the magnification adjusting lens 23 which is the closer to the deflecting reflective surface is indicated by 2; the rear surface of the same lens which is the closer to the surface to be scanned is indicated by 3; the front surface of the convex lens 22 (i.e. the scanning optics of the invention) which is the closer to the deflecting reflective surface is indicated by 4; and the rear surface of the same lens which is the closer to the surface to be scanned is indicated by 5. Each lens surface has curvature radii $r_i$ and $r'_i$ in the main and sub-scanning directions, respectively, an axial distance $d_i$ from the ith surface to the (i+1)th surface, and a refractive index $n_i$ at the wavelength 780 nm, and these parameters assume the following values:

| i | $r_i$ | $r'_i$ | $d_i$ | $n_i$ |
|---|---|---|---|---|
| 1 | 0.0000 | 0.0000 | 16.9000 | 1.00000 |
| 2 | 0.0000 | 0.0000 | 2.0000 | 1.48601 |
| 3 | 0.0000 | 6.8000 | 13.5000 | 1.00000 |
| 4 | 127.4000 | 127.4000 | 16.9000 | 1.48601 |
| 5 | −75.1700 | −12.3800 | 95.7000 | 1.00000 |

The fourth surface is an aspheric surface x which is expressed by the same equation as given in the first example, in which the respective aspheric coefficients assume the following values:

$k=0.00000E+00; a=-0.10728E-0.5; b=0.35661E-09 c=0.00000E+00; d=-0.44641E-16$

The fourth surface has a focal length (FL) of 100.002. The system shown in FIG. 6 is also characterized by the following data:

$Pr=13.1; \theta=80°; Px=10.12; Py=8.89$

The fifth surface is the rear surface of the convex lens 22 which is closer to the surface to be scanned. As is clear from the data on the radius of curvature ($r_3=75.1700$ and $r'_5=-12.3800$), the fifth surface has a positive power in both the main and sub-scanning directions. Another feature of the fifth surface is that any section taken through a plane that is parallel to the central optical axis and which is normal to the main scanning direction provides a constant surface geometry in the main scanning direction.

Figure 7A:
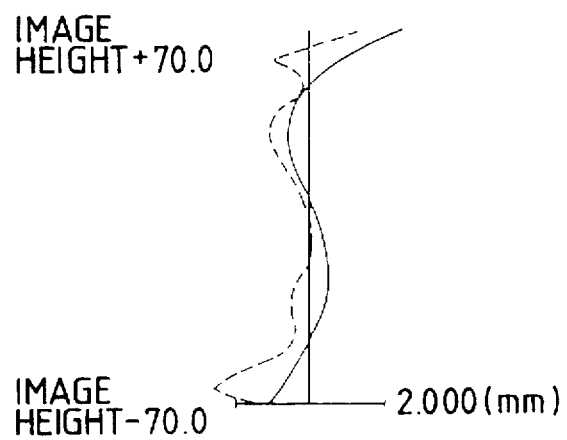
FIGS. 7a and 7b are graphs showing the field curvature and fθ characteristics, respectively, of the scanning optics shown in FIG. 6 which is in accordance with the second example of the invention.
Figure 7B:
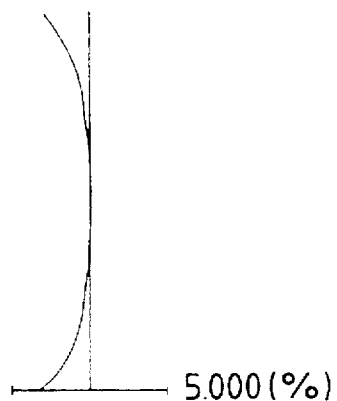

The field curvature and fθ characteristics of the scanning optics according to the second example of the invention are shown in FIGS. 7a and 7b, respectively. The dashed line in FIG. 7a represents the image plane in the main scanning direction and the solid line represents the image plane in the sub-scanning direction.

The magnification adjusting lens 23 used in the second example is a cylindrical concave lens defined by $r_2=r'_2=0.0000$, $r_3=0.0000$ and $r'_3=6.8000$; the primary function of this lens is to bring the image plane in the main scanning direction into coincidence with the image plane in the sub-scanning direction when the variations in the sub-scanning direction are to be reduced by shortening the focal length in the sub-scanning direction.

Figure 8:
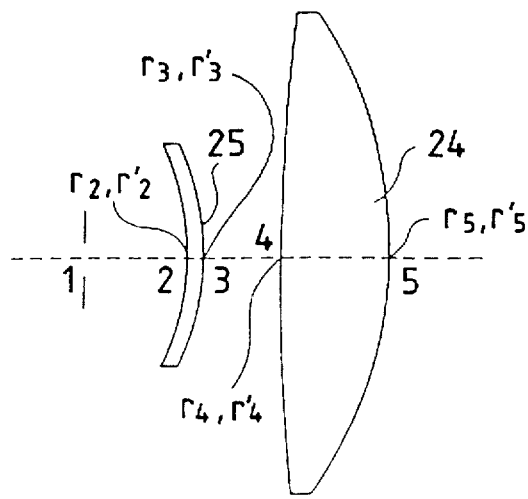
FIG. 8 is a plan view showing scanning optics according to the third example of the invention.

FIG. 8 is a plan view showing scanning optics according to the third example of the invention. As in the first and second examples, the optics is composed of a single convex lens element 24 having the defined anamorphic surface. In the third example, a magnification adjusting lens 25 is provided adjacent the convex lens 24 on side which is the closer to a deflecting reflective surface of the light deflector. The primary function of the lens 25 is to reduce the magnification in the sub-scanning direction to adjust the focal length.

A deflecting reflective surface of the light deflector (not shown) is indicated by numeral 1; the front surface of the magnification adjusting lens 25 which is closer to the deflecting reflective surface is indicated by 2; the rear surface of the same lens which is closer to the surface to be scanned is indicated by 3; the front surface of the convex lens 24 (i.e. the scanning optics of the invention) which is closer to the deflecting reflective surface is indicated by 4; and the rear surface of the same lens which is closer to the surface to be scanned is indicated by 5. Each lens surface has curvature radii $r_i$ and $r'_i$ in the main and sub-scanning directions, respectively, an axial distance $d_i$ from the ith surface to the (i+1)th surface, and a reflective index $n_i$ at the wavelength 780 nm, and these parameters assume the following values:

| i | $r_i$ | $r'_i$ | $d_i$ | $n_i$ |
|---|---|---|---|---|
| 1 | 0.0000 | 0.0000 | 14.6000 | 1.00000 |
| 2 | −36.4600 | −36.4600 | 2.2000 | 1.48601 |
| 3 | −36.4600 | 7.3000 | 10.9000 | 1.00000 |
| 4 | 256.0000 | 256.0000 | 16.0000 | 1.48601 |
| 5 | −61.8500 | −11.0800 | 99.2000 | 1.00000 | the first surface is a deflecting reflective surface of the light deflector and the third surface is an anamorphic surface defined by $r_3=-36.4600$ and $r'_3=7.3000$.

The second and fourth surfaces are each an aspheric surface of revolution x, which is expressed by:

$$x=(1/r)y^2/\{1+\sqrt{1-(1+k)y^2/r^2}\}+ay^4+by^6+cy^8+dy^{10}+ey^{12}$$

where $r=r_2=r'_2$ or $r=r_4=r'_4$.

The respective aspheric coefficients for the second surface assume the following values:

$k=0.00000E+00; a=0.00000E+00; b=0.12132E-08$ $c=0.00000E+00; d=0.00000E+00; e=-0.00000E+00$

The respective aspheric coefficients for the fourth surface assume the following values:

$k=0.00000E+00$; $a=-0.77407E-06$; $b=0.24264E-09$ $c=0.00000E+00$; $d=-0.22321E-16$; $e=0.00000E+00$

The second and fourth surfaces have a focal length (FL) of 99.99. The system shown in FIG. 8 is also characterized by the following data:

$Pr=16.06$; $e=80°$; $Px=12.49$; $Py=11.42$

The fifth surface is the rear surface of the convex lens 24 which is closer to the surface to be scanned. As is clear from the data on the radius of curvature ($r_5=-61.8500$ and $r'_5=-11.0800$), the fifth surface has appositive power in both the main and sub-scanning directions. Another feature of the fifth surface is that any section taken through a plane that is parallel to the central optical axis and which is normal to the main scanning direction provides a constant surface geometry in the main scanning direction.

Figure 9A:
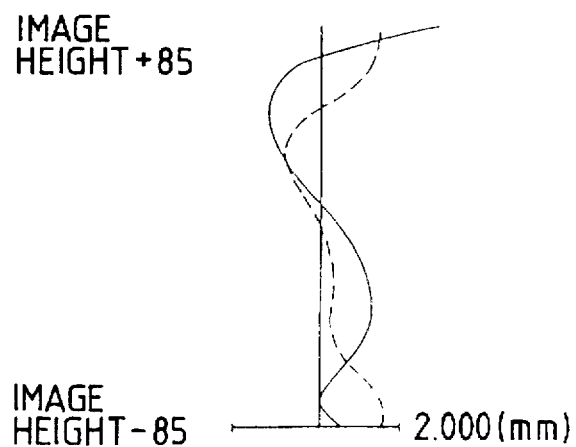
FIGS. 9a and 9b are graphs showing the field curvature and fθ characteristics, respectively, of the scanning optics shown in FIG. 8 which is in accordance with the third example of the invention.
Figure 9B:
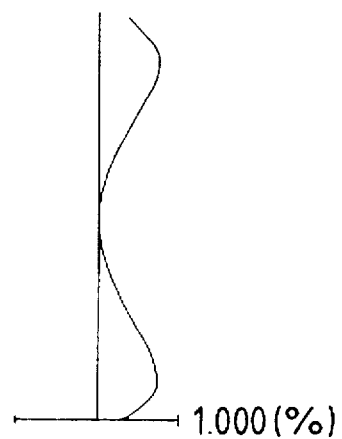

The field curvature and fθ characteristics of the scanning optics according to the third example of the invention are shown in FIGS. 9a and 9b, respectively. The dashed line in FIG. 9a represents the image plane in the main scanning direction and the solid line represents the image plane in the sub-scanning direction.

The magnification adjusting lens 25 used in the third example is a toric lens such that the surface indicated by 3 has a negative power (to exert a diverging action) in the subscanning direction; the primary function of this lens is to bring the image plane in the main scanning direction into coincidence with the image plane in the sub-scanning direction when the variations in the sub-scanning direction are to be reduced by shortening the focal length in the sub-scanning direction.

Figure 10:
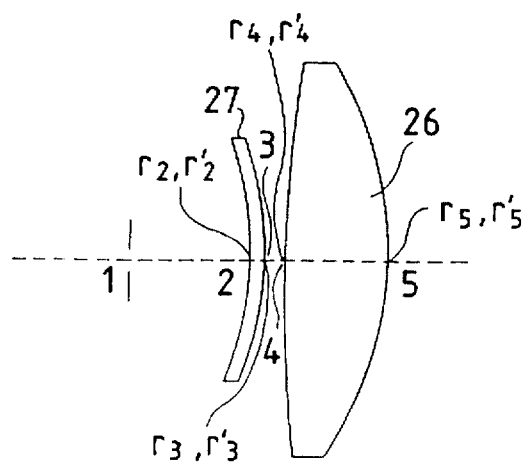
FIG. 10 is a plan view showing scanning optics according to the fourth example of the invention.

FIG. 10 is a plan view showing scanning optics according to the fourth example of the invention. As in the three examples already described, the optics is composed of a single convex lens element 26 having the defined anamorphic surface. In the fourth example, a magnification adjusting lens 27 for reducing the magnification in the sub-scanning direction is provided adjacent the convex lens 26 on the side which is closer to a deflecting reflective surface of the light deflector.

A deflecting reflective surface of the light deflector (not shown) is indicated by numeral 1; the front surface of the magnification adjusting lens 27 which is closer to the deflecting reflective surface is indicated by 2; the rear surface of the same lens which is closer to the surface to be scanned is indicated by 3; the front surface of the convex lens 26 (i.e. the scanning optics of the invention) which is closer to the deflecting reflective surface is indicated by 4; and the rear surface of the same lens which is closer to the surface to be scanned is indicated by 5. Each lens surface has curvature radii $r_i$ and $r'_i$ in the main and sub-scanning directions, respectively, an axial distance $d_i$ from the ith surface to the (i+1)th surface, and a refractive index $n_i$ at the wavelength 780 nm, and these parameters assume the following values:

| i | $r_i$ | $r'_i$ | $d_i$ | $n_i$ |
|---|---|---|---|---|
| 1 | 0.0000 | 0.0000 | 19.0000 | 1.00000 |
| 2 | −50.6400 | −50.6400 | 2.2000 | 1.48601 |
| 3 | −51.3200 | 15.8000 | 3.3000 | 1.00000 |
| 4 | 280.0000 | 280.0000 | 16.0200 | 1.48601 |
| 5 | −58.8000 | −10.0000 | 99.5819 | 1.00000 |

The second surface which is aspheric and the third surface which is anamorphic have the geometry x expressed by the following equation (in the case of the anamorphic surface, the plane in the main scanning direction is considered):

$$x=(1/r)y^2/\{1+\sqrt{[1-(1+k)y^2/r^2]}\}+ay^4+by^6+cy^8+dy^{10}+ey^{12}$$

The respective aspheric coefficients for the second surface assume the following values:

$k=0.00000E+00$; $a=-0.16800E-05$; $b=0.60300E-09$ $c=-0.16600E-10$; $d=0.98700E-13$; $e=-0.12800E-17$

The respective aspheric coefficients for the third surface assume the following values:

$k=0.00000E+00$; $a=-0.00000E+00$; $b=0.00000E+00$ $c=0.00000E+00$; $d=0.38000E-13$; $e=0.00000E+00$

The second and third surfaces have a focal length (FL) of 100.07. The system shown in FIG. 10 is also characterized by the following data:

$Pr=11.6$; $θ=80°$; $Px=8.97$; $Py=7.96$

Figure 11A:
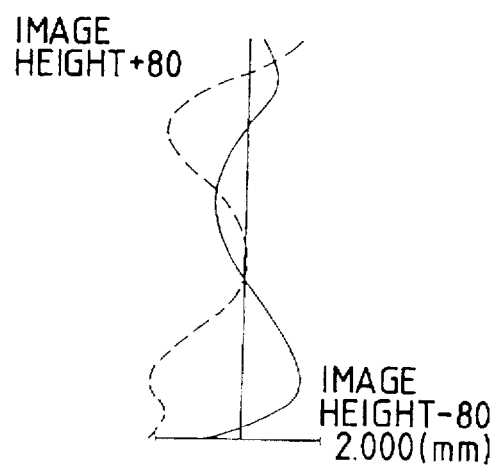
FIGS. 11a and 11b are graphs showing the field curvature and fθ characteristics, respectively, of the scanning optics shown in FIG. 10 which is in accordance with the fourth example of the invention.
Figure 11B:
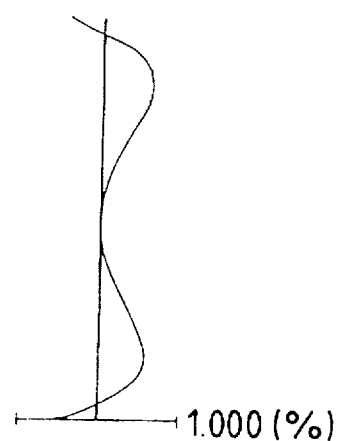

The field curvature and fθ characteristics of the scanning optics according to the fourth example of the invention are shown in FIGS. 11a and 11b, respectively. The dashed line in FIG. 11a represents the image plane in the main scanning direction and the solid line represents the image plane in the sub-scanning direction.

The magnification adjusting lens 27 used in the fourth example is an anamorphic lens having a negative power in the sub-scanning direction and the surface indicated by 3 has such a feature that any section taken through a plane that is parallel to the central optical axis and which is normal to the main scanning direction provides a constant surface geometry in the main scanning direction. The primary function of this lens is to bring the image plane in the main scanning direction into coincidence with the image plane in the sub-scanning direction when the variations in the sub-scanning direction are to be reduced by shortening the focal length in the sub-scanning direction.

While the invention accomplished by the present inventors has been described above on the basis of four specific examples, it should be understood that the invention is by no means limited to these examples and that various modifications can be made without departing from the spirit and scope of the invention. For instance, the light deflector is in no way limited to the rotating polygonal mirror used in the example but a rotating single or double mirror or any other devices may be used as long as they are capable of deflecting incident light at uniform angular velocity.

As described on the foregoing pages, the scanning optics of the invention is composed of a single convex lens element having a positive (convergent) power in both the main and sub-scanning directions on the surface which is closer to the surface to be scanned and which is anamoraphic such that any section taken through a plane that is parallel to the central optical axis and which is normal to the main scanning direction provides a substanially constant surface geometry in the main scanning direction. This design ensures that not only the production of a good image plane and satisfactory fφ characteristics in the main scanning direction but also the correction of the field curvature in the sub-scanning direction can be accomplished with a single convex lens element, whereby the construction of the scanning optics is simplified to achieve a higher production rate.

What is claimed is:

1. Scanning optics that has an fθ capability in the main scanning direction and a capability for correcting the tilting of an image plane in the sub-scanning direction defined by a generally conjugated relationship in geometrical optical terms between the position of a deflecting reflective surface and that of the surface to be scanned, comprising:

a single biconvex lens element such that the surface which is closer to the surface to be scanned is convex in both the main and sub-scanning directions and such that any section taken through a plane which is parallel to the central optical axis of the scanning optics and which is normal to the main scanning direction has a generally constant surface geometry in the main scanning direction.

2. Scanning optics according to claim 1, wherein a lens having a negative power in the sub-scanning direction for adjusting magnification in the sub-scanning direction is provided adjacent the convex lens element on the side which is closer to the deflecting reflective surface.

3. Scanning optics according to claim 1, wherein the surface of the convex lens element which is closer to the surface to be scanned has such a surface geometry that any section taken through a plane that is parallel to the central optical axis of scanning light and which is normal to the main scanning direction has the same radius of curvature in the main scanning direction.

4. Scanning optics which allows rays of light from a laser to be deflected at uniform angular velocity by a deflecting reflective surface of a light deflector and which allows the thus deflected rays of light to be focused as a beam spot on the surface to be scanned, comprising:

a single convex lens element such that the surface which is closer to the surface to be scanned is convex in both the main and sub-scanning directions and has a positive power in both the main and sub-scanning directions and such that any section taken through a plane which is parallel to the central optical axis of the convex lens element and which is normal to the main scanning direction has a generally constant surface geometry in the main scanning direction.

5. Scanning optics according to claim 4, wherein a lens for adjusting magnification in the sub-scanning direction is provided adjacent the convex lens element on the side which is closer to the deflecting reflective surface.

6. Scanning optics according to claim 4, wherein the surface of the convex lens element which is closer to the surface to be scanned has such a surface geometry that any section taken through a plane that is parallel to the central optical axis of scanning light and which is normal to the main scanning direction has the same radius of curvature in the main scanning direction.

* * * * *